United States Patent [19]

Ivarsson et al.

[11] 4,061,501

[45] Dec. 6, 1977

[54] REFRACTORY LININGS

[75] Inventors: Paul Lennart Ivarsson; Peter Harry Havranek, both of Hoganas, Sweden

[73] Assignee: Hoganas AB, Hoganas, Sweden

[21] Appl. No.: 620,228

[22] Filed: Oct. 6, 1975

Related U.S. Application Data

[63] Continuation-in-part of Ser. No. 579,698, May 21, 1975, abandoned, which is a continuation-in-part of Ser. No. 358,304, May 8, 1973, abandoned, and Ser. No. 468,418, May 8, 1974, abandoned.

[30] Foreign Application Priority Data

| Apr. 13, 1973 | Sweden | 7305330 |
| May 9, 1972 | Finland | 1304/72 |
| May 11, 1973 | Sweden | 7306722 |

[51] Int. Cl.$^2$ .................. C04B 35/04; C04B 35/14; C04B 35/52

[52] U.S. Cl. .................................. 106/44; 106/56; 106/58; 106/67; 106/68; 106/69

[58] Field of Search .................. 106/69, 58, 68, 44, 106/56, 67

[56] References Cited

U.S. PATENT DOCUMENTS

| 2,329,589 | 9/1943 | Carter | 106/68 |
| 3,253,936 | 5/1966 | Weindel | 106/69 |
| 3,436,236 | 4/1969 | Gamber et al. | 106/69 |
| 3,467,535 | 9/1969 | Myles | 106/69 |
| 3,629,116 | 12/1971 | Gartner et al. | 106/69 |

*Primary Examiner*—J. Poer
*Attorney, Agent, or Firm*—Toren, McGeady and Stanger

[57] ABSTRACT

A refractory material contains a small quantity of colloidal silica. The colloidal silica increases the resistance of the material against aggressive slags.

9 Claims, No Drawings

REFRACTORY LININGS

This application is a continuation-in-part of our application Ser. No. 579,698, filed on May 21, 1975, now abandoned (which is a continuation-in-part of Ser. No. 358,304, filed on May 8, 1973, now abandoned) and our application Ser. No. 468,418, now abandoned, filed on May 8, 1974.

The present invention is related to improving the resistance of refractory materials against aggressive slags.

It has previously been proposed (see our Swedish Pat. No. 350,475) to improve the properties of refractory linings in furnaces, crucibles and other vessels which are subjected to attack from aggressive slags, by impregnating the finished linings or moulded bodies (bricks) from which the linings are built, with a water solution of colloidal silica so that after drying the pores and cracks of the linings or moulded bodies will at least be substantially filled with colloidal silica particles.

Continued experiments have shown now that better resistance against aggressive slags is obtained if the colloidal silica is mixed into the compositions or compounds from which the linings or moulded bodies (bricks) intended for these are manufactured.

Colloidal silica is commercially available in the form of aqueous suspensions with different $SiO_2$ concentrations, e.g. under the registered trade mark "LUDOX" (DuPont). In order to obtain appropriate consistency properties, we normally use suspensions containing 40% $SiO_2$. This suspension is mixed in conventional refractory masses consisting of refractory grains (grog) and a binder.

The compositions or compounds which can be improved in this way according to the invention are compositions for rammed linings, and for cast and moulded articles, and also compositions for the manufacture of refractory moulded bodies (bricks) as well as mortar using for the joints between such bricks. The improved composition is also useful for ladles and saggers, for example saggers for the manufacture of sponge iron.

Common for these compositions is that they consist of two primary components, namely a granular filler of refractory material and a binder, as well as sufficient water to make the composition workable for the manufacture of a lining or moulded body.

The refractory filler material, generally referred to as grog, is screened below about 6 mm, and contains usually about 25 – 30% fines, i.e. particles below 1 mm. The filler material may be basic, such as magnesite and dolomite, neutral, such as $Al_2O_3$, bauxite, kaolin and silicon carbide, or acid such as quartzite. Mixtures of such grog material are also possible, for example mixtures of magnesite and bauxite or various mixtures of about 5 – 40%, usually 10 – 15%, SiC in other grog materials.

In highly refractory basic brick, magnesite may be included in quantities of 90 – 99%. In the highly refractory $Al_2O_3$-based brick, the content of $Al_2O_3$ is often 85 – 95%, in the kaolin material the kaolin content is often 85 – 90%, in the quartzite material the content of quartzite is 85 – 90% or even higher, and in the pure silicon carbide moulded bodies in the SiC content is 85 – 95%.

The binder normally used may also be of different types and is divided into three main groups for the various fields of application well known to the expert in refractory ceramics, namely:

1. Binder of the bond clay type forming a glass phase,
2. Cement-type binder such as aluminates and chromates (chromic acid)
3. Phosphoric acid
4. Temporary binders such as spent sulphite liquor and synthetic organic binders such as carboxymethyl cellulose (CMC).

Of course, the content of binder varies, as is well known in the art, according to the type of binder used and its application, but is usually between 2 – 15% by weight.

Compositions of the type described above can be considerably improved according to the invention from the point of view of strength, and particularly with regard to the resistance to molten slag, by mixing into them colloidal silica in a quantity corresponding to 0.5 – 10, preferably around 2 percent by weight $SiO_2$ calculated on the solids content of the finished composition.

Compositions which are improved according to the invention by the addition of colloidal silica are used in the conventional manner for the manufacture of linings of furnaces or other vessels which at high temperatures are subject to the attack of slag. When the lining consists of moulded bodies (bricks), colloidal silica should also be mixed into the refractory mortar used.

In order to further improve the effect of the invention it may in certain cases, for example when dealing with particularly aggressive slags, be advantageous after the lining is complete to impregnate the surfaces of the lining which are subject to slag attack with a water suspension of the colloidal silica and then dry them to fill out any remaining porosity or cracks with particles of colloidal silica.

An interesting field of application of this invention is refractory lining materials of the type containing slag resistant carbon, such as coke, pitch, graphite and silicon carbide. It is well known that carbonaceous materials of the types referred to, usually screened below 1 mm and preferably below 0.2 mm, increase the slag resistant capacity of the refractory lining material. It has been found, however, that the slag resistance of such refractory lining materials gradually decreases, because of oxidation of the carbonaceous particles. This oxidation is particularly pronounced if the carbonaceous material has a very small particle size. The addition of colloidal silica to such refractory materials has now been found to reduce or delay the oxidation of the carbonaceous material. Consequently, the addition of colloidal silica according to the invention increases the slag resistance of the refractory material in two ways, viz. directly by its own slag resistance, and indirectly by protecting the carbonaceous material from being oxidized.

The colloidal silica is effective for increasing the slag resistance both at high and low temperatures. This is in contrast to glazes which have previously been used in an attempt of increasing the slag resistance.

Glazes which should give slag protection at temperatures close to 1000° C would have a negative effect since they act similar to penetrating slags at the normal operating temperature for refractory linings which lie between 1300° C and 1700° C. If on the other hand, one chooses glazes with a higher melting point one can obtain protection when this temperature is reached, but not at the lower temperatures, e.g., during the firing of bricks or other shaped bodies or rammed or cast linings.

It has been shown that it is advantageous, inter alia, in order to optimize the utilization of the silica, to premix the colloidal silica with the carbonaceous material. The mixture of carbon or carbon containing materials and colloidal silica thus produced is subsequently mixed with the other ingredients of the refractory mass. A useful premixed composition of carbonaceous material and colloidal silica consists preferably of an aqueous suspension of carbonaceous material and colloidal silica. If desired, wetting or viscosity controlling agents and suspension stabilizers may be added. The weight ratio of the components is preferably 10-15 parts of carbon or carbonbearing material (carbonaceous material) to 0.4-4 parts of colloidal silica. The particle size of the carbonaceous material is usually less than 1 mm, and is preferably less than 0.2 mm.

The following are some examples of compositions suitable for manufacturing refractory moulded bodies (bricks). The type of binder has not been specified in some of the examples as the binder is well known to anyone skilled in the art for the brick compositions exemplified.

EXAMPLE 1 — Basic brick composition

Magnesite, screened below 6 mm: 96 parts
Binder: 5 parts
40% solution of colloidal silica: 5 parts

EXAMPLE 2 — Basic brick composition

Magnesite, screened below 6 mm: 65 parts
Bauxite: 30 parts
40% solution of colloidal silica: 5 parts
Binder: 5 parts

EXAMPLE 3 — Acid brick composition

Quartzite, screened below 6 mm: 98 parts
Lime: 2 parts
40% solution of colloidal silica: 5 parts

EXAMPLE 4 — Silicon carbide brick composition

SiC, screened below 3 mm: 95 parts
Binder: 5 parts
40% solution of colloidal silica: 5 parts

EXAMPLE 5 — Magnesite brick composition

Magnesite, screened below 6 mm: 99 parts
Binder: 1 part
40% solution of colloidal silica: 5 parts

EXAMPLE 6 — Corundum brick composition

Al$_2$O$_3$ (corundum) screened below 6 mm: 95 parts
Binder (ball clay): 5 parts
40% solution of colloidal silica: 5 parts Water is included in all the examples 1 - 6, if necessary, to make the composition mouldable or workable.

EXAMPLE 7 — Fire-clay Refractory 5 parts by weight of a suspension of colloidal silica containing 40% solids is added to 45 parts by weight of calcined fire-clay screened below 6.0 mm, about 45 parts by weight of clay screened below 1.0 mm, and 10 parts graphite powder. The water addition of the mix is controlled according to the method of application of the mix, i.e. ramming, casting or pressing of burned refractory shapes.

EXAMPLE 8 — Corundum Refractory 5 parts by weight of a suspension of colloidal silica containing 40% solids is added to 75 parts by weight of corundum (Al$_2$O$_3$) screened below 6.0 mm, about 10 parts by weight of refractory clay screened below 1.00 mm and about 15 parts silicon carbide screened below 100 mesh, i.e., below 0.15 mm. The batch is mixed with the amount of water required for the method of application, i.e.. ramming, casting, or pressing of burned refractory shapes.

EXAMPLE 9 — Magnesite Refractory 5 parts by weight of a suspension of colloidal silica containing 40% solids is added to 90 parts by weight of magnesite (MgO) screened below 6.0 mm, 10 parts by weight of pitch screened below 1.0 mm, and 2 parts by weight of magnesium sulphate (MgSO$_4$) dissolved in water. The batch is mixed with the amount of water required for the method of application, i.e. ramming, casting, or pressing of shapes, such as, bricks.

In all of the examples 7 - 9, it is preferred to premix colloidal silica with the carbonaceous materials, such as, graphite, pitch, or silicon carbide with the optional addition of a conventional wetting agent, followed by mixing with the rest of the components of the batch.

A series of tests was made in which a colloidal silica suspension in a quantity varying from 1 to 10 percent of a 40 percent water suspension was added to a corundum refractory according to Example 8 above, corresponding to about 0.4 to 4% of SiO$_2$ in the dry mass. In test crucibles (DIN Standard 1069 and 51069) made from these masses, a grey iron slag was molten and held at 1530° C for 4 hours.

Inspection of the test crucibles after cooling on slag penetration in the border between slag and refractory material shows that in this case, some improvements e.g. less penetration could be observed already at an addition of 0.4% colloidal SiO$_2$, calculated on a dry mass basis, and that a significant effect was obtained at 1% of SiO$_2$, calculated on a dry mass basis, particularly when the colloidal silica was premixed with the silicon carbide before addition to the other ingredients. No significant further improvement could be observed when the colloidal SiO$_2$ content, calculated on a dry mass basis, was increased from 2 to 3 or 4%.

In the above examples 7 - 9 and tests, the common average content of about 10 - 15% by weight of a conventional carbon carrier has been used in the different masses. It is obvious that, according to the invention, variations of the content of carbon carrier should be compensated by a corresponding variation of the quantity of added silica.

What is claimed is:

1. A method for producing a lining material consisting essentially of refractory grains screened below 6 mm and selected from the group consisting of magnesite, dolomite, alumina, bauxite kaolin, silicon carbide, and quartzite, and from 2 to 15 percent by weight of the total solids content of a binder selected from the group consisting of bond clay, aluminate and chromate cements, phosphoric acid, spent sulphite liquor and carboxymethyl cellulose, and containing an additional content of a water suspension colloidal silica in a quantity corresponding to 0.4 – 4% SiO$_2$ by weight of the solids content of the lining material and further containing carbonaceous material selected from the group consisting of coke, graphite, pitch, and silicon carbide, screened below 1 mm comprising mixing the carbonaceous material and the colloidal silica in the form of a water suspension, and subsequently intermixing the mixture thus obtained with the other ingredients.

2. A slag resistant refractory lining material consisting of 75 parts by weight of corundum screened below 6 mm, 10 parts by weight of refractory clay screened below 1.0 mm, 15 parts by weight of silicon carbide screened below 0.15 mm and an additional 5 parts by weight of a 40 percent water suspension of colloidal silica.

3. A slag resistant refractory lining material consisting essentially of refractory grains of silicon carbide screened below 6 mm, and from 2 to 15 percent by weight of the total solids content of a binder selected from the group consisting of bond clay, aluminate, and chromate cements, phosphoric acid, spent sulphite liquor and carboxymethyl cellulose, and containing an additional amount of water suspension colloidal silica in a quantity corresponding to 0.4 - 4% $SiO_2$ by weight of the solids content of the lining material and further containing a carbonaceous material selected from the group consisting of coke, graphite, pitch, and silicon carbide, screened below 1 mm.

4. A slag resistant refractory lining material as claimed in claim 3, wherein the carbonaceous material is screened below 0.2 mm.

5. A slag resistant refractory material as claimed in claim 3, in which the amount of colloidal silica corresponds to 1 - 2% $SiO_2$ by weight of the solids content of the lining material.

6. A slag resistant refractory material as claimed in claim 3, in which the content of carbonaceous material is 10 - 15%, and the amount of colloidal silica corresponds to 1 - 2% $SiO_2$, said percentages being calculated on the solids content of the lining material.

7. A slag resistant refractory lining material as claimed in claim 3, containing 95 parts silicon carbide, 5 parts binder, and 5 parts of a 40% suspension of colloidal silica.

8. A slag resistant refractory lining material comprising 45 parts calcined fire-clay screened below 6 mm, 45 parts clay screened below 1 mm, 10 parts graphite powder, and 5 parts of a 40% suspension of colloidal silica.

9. A slag resistant refractory lining material comprising 90 parts magnesite screened below 6 mm, 10 parts pitch screened below 1 mm, 2 parts magnesium sulphate dissolved in water, and 5 parts of a 40% suspension of colloidal silica.

* * * * *